United States Patent
Wei et al.

(10) Patent No.: US 11,440,768 B2
(45) Date of Patent: Sep. 13, 2022

(54) ACQUISITION OF POSITION OF ELEVATOR CAR

(71) Applicant: Otis Elevator Company, Farmington, CT (US)

(72) Inventors: Lieping Wei, Shanghai (CN); Wenbo Huang, Shanghai (CN); XiaoBin Tang, Tianjin (CN)

(73) Assignee: OTIS HIGH RISE ELEVATOR (SHANGHAI) CO., LTD., Farmington, CT (US)

( * ) Notice: Subject to any disclaimer, the term of this patent is extended or adjusted under 35 U.S.C. 154(b) by 214 days.

(21) Appl. No.: 16/714,133

(22) Filed: Dec. 13, 2019

(65) Prior Publication Data

US 2020/0385235 A1 Dec. 10, 2020

(30) Foreign Application Priority Data

Jun. 4, 2019 (CN) .......................... 201910480870.6

(51) Int. Cl.
| | |
|---|---|
| B66B 1/34 | (2006.01) |
| H04W 4/33 | (2018.01) |
| H04W 4/80 | (2018.01) |
| B66B 3/02 | (2006.01) |
| H04W 4/02 | (2018.01) |

(52) U.S. Cl.
CPC ............ *B66B 1/3492* (2013.01); *B66B 3/023* (2013.01); *H04W 4/023* (2013.01); *H04W 4/33* (2018.02); *H04W 4/80* (2018.02); *B66B 1/3453* (2013.01)

(58) Field of Classification Search
CPC ......... B66B 1/3492; H04W 4/33; H04W 4/80
See application file for complete search history.

(56) References Cited

U.S. PATENT DOCUMENTS

| | | | |
|---|---|---|---|
| 2007/0041352 A1* | 2/2007 | Frankel | B66B 1/468 370/338 |
| 2011/0200023 A1* | 8/2011 | Murray | G01S 5/02 455/41.1 |

(Continued)

FOREIGN PATENT DOCUMENTS

WO 2019002660 A1 1/2019

OTHER PUBLICATIONS

European Search Report for Application No. 19217493.6; dated Aug. 28, 2020; 9 Pages.

*Primary Examiner* — Wen W Huang
(74) *Attorney, Agent, or Firm* — Cantor Colburn LLP (57) ABSTRACT

Acquisition of position information of an elevator car. The system for acquiring the position information of an elevator car of the invention comprises: a first Bluetooth module travelling in an up-down direction of an elevator hoistway following the elevator car, and a second Bluetooth module disposed in the elevator hoistway; wherein the second Bluetooth module broadcasts a Bluetooth signal containing an identifier of the second Bluetooth module to the elevator hoistway, and the first Bluetooth module senses signal strength information of the Bluetooth signal it receives and determines the identifier corresponding to the second Bluetooth module broadcasting the received Bluetooth signal; the system is configured to determine the position information of the elevator car according to received signal strength information of the Bluetooth signal and a corresponding identifier.

22 Claims, 4 Drawing Sheets

(56) References Cited

U.S. PATENT DOCUMENTS

| | | | |
|---|---|---|---|
| 2015/0348049 A1* | 12/2015 | Todasco | G06Q 50/12 |
| | | | 705/14.1 |
| 2016/0088421 A1* | 3/2016 | Warner | H04W 4/80 |
| | | | 455/41.2 |
| 2016/0185568 A1* | 6/2016 | Kusserow | H04W 52/0203 |
| | | | 340/3.31 |
| 2017/0013409 A1* | 1/2017 | Cerchio | H04W 72/0473 |
| 2017/0349402 A1* | 12/2017 | Chapman | B66B 1/468 |
| 2018/0077521 A1* | 3/2018 | Arunachalam | G01S 13/931 |
| 2018/0077535 A1* | 3/2018 | Todeschini | G06K 7/1413 |
| 2018/0370758 A1* | 12/2018 | Huang | B66B 1/3461 |
| 2019/0062109 A1 | 2/2019 | Nanjappan | |
| 2019/0208492 A1* | 7/2019 | Maruta | G01S 5/0231 |
| 2019/0373530 A1* | 12/2019 | Witczak | H04W 72/04 |
| 2020/0283263 A1* | 9/2020 | Studer | B66B 5/0037 |
| 2020/0363491 A1* | 11/2020 | Studer | H04N 5/2253 |

\* cited by examiner

ACQUISITION OF POSITION OF ELEVATOR CAR

CROSS-REFERENCE TO RELATED APPLICATION

This application claims priority from Chinese patent application No. 201910480870.6, filed on Jun. 4, 2019, the entirety of which is hereby incorporated by reference herein and forms a part of the specification.

FIELD OF THE INVENTION

The invention relates to the technical field of elevator, a system and method for acquiring position information of an elevator car based on a Bluetooth module disposed in an elevator hoistway, and an elevator system using the system for acquiring position information of the elevator car.

BACKGROUND OF THE INVENTION

The elevator has an elevator car moving up-down in an elevator hoistway, and during running of the elevator, the elevator control device needs to determine the position of the elevator car in the elevator hoistway in real time, thus controlling the running of the elevator car based on the position information. Therefore, the position information of the elevator system is the basic information of the elevator running, and the position of the elevator car needs to be continuously identified during the running of the elevator.

However, during the running of the elevator, there is a situation where the position information of the elevator car is lost, e.g., the position information of the elevator car is lost due to the brief outage and the like of the elevator system. In this case, it is needed to recover the acquisition of, for example, floor position information of the elevator system as soon as possible.

Currently, when the position information of the elevator system is lost or the current position information is invalid, the elevator car is normally driven to run to the bottommost or uppermost end of the elevator hoistway under the control of the elevator control device, thereby the position information of the elevator system is recorrected and the elevator control device is enabled to acquire valid position information (e.g., floor position information).

SUMMARY OF THE INVENTION

According to a first aspect of the present invention, there is provided a system for acquiring position information of an elevator car, comprising: a first Bluetooth module travelling in an up-down direction of an elevator hoistway following the elevator car, and a second Bluetooth module disposed in the elevator hoistway; wherein the second Bluetooth module broadcasts a Bluetooth signal containing an identifier of the second Bluetooth module to the elevator hoistway, and the first Bluetooth module senses signal strength information of the Bluetooth signal it receives and determines the identifier corresponding to the second Bluetooth module broadcasting the received Bluetooth signal; the system is configured to determine position information of the elevator car according to the received signal strength information of the Bluetooth signal and a corresponding identifier.

The first Bluetooth module and the second Bluetooth module are networked to form a Bluetooth MESH network.

The first Bluetooth module in the system is configured to determine the position information of the elevator car according to the received signal strength information of the Bluetooth signal and the corresponding identifier.

The first Bluetooth module in the system is further configured to broadcast the position information to the Bluetooth MESH network.

The first Bluetooth module in the system is configured to broadcast the signal strength information of the Bluetooth signal it receives and the identifier corresponding to the second Bluetooth module broadcasting the Bluetooth signal to the Bluetooth MESH network, and one of a plurality of second Bluetooth modules in the system is configured to determine the position information of the elevator car based on the received signal strength information and the corresponding identifier and to broadcast the position information to the Bluetooth MESH network.

Information reflecting the association of the position information of the elevator car and the signal strength information and the corresponding identifier and used for determining the position information of the elevator car is configured in the first Bluetooth module and/or the second Bluetooth module of the system.

The information of the association is presented by a table or a signal strength-position calculation; wherein based on the received signal strength information of the Bluetooth signal and the corresponding identifier, corresponding position information is found out from the table; or based on the received signal strength information of the Bluetooth signal, the corresponding position information is calculated using the signal strength-position calculation.

The association is obtained by learning in advance in the following manner: the elevator car with known position information travelling in the up-down direction of the elevator hoistway, recording the signal strength information of one or more of the Bluetooth signals received by the first Bluetooth module corresponding to each position and a corresponding identifier, and generating the association based on the known position information and the correspondingly recorded signal strength information and the corresponding identifier.

The system is further utilized to transmit the position information to a third Bluetooth module, wherein the third Bluetooth module, the first Bluetooth module, and the plurality of second Bluetooth modules are networked to form the Bluetooth MESH network.

A multi-hop wireless link is established between the first Bluetooth module, one or more of the second Bluetooth modules, and the third Bluetooth module when transmitting the position information from the first Bluetooth module to the third Bluetooth module.

The first Bluetooth module, the second Bluetooth module, and the third Bluetooth module are Bluetooth Low Power modules.

The length of the elevator hoistway is greater than or equal to 50 meters.

The spacing between adjacent ones of the second Bluetooth modules is smaller than a Bluetooth signal transmission distance of the second Bluetooth module.

The first Bluetooth module, the second Bluetooth module, and the third Bluetooth module are assigned a unique identifier, respectively.

According to a second aspect of the present invention, there is provided a method for acquiring position information of an elevator car, comprising: sensing signal strength information of a Bluetooth signal in an elevator hoistway by a first Bluetooth module travelling in an up-down direction of the elevator hoistway following the elevator car, wherein the Bluetooth signal comprises the Bluetooth signal containing an identifier of a second Bluetooth module broadcast to the elevator hoistway by the second Bluetooth module disposed in the elevator hoistway; determining the identifier corresponding to the second Bluetooth module broadcasting the received Bluetooth signal; and determining position information of the elevator car according to the received signal strength information of the Bluetooth signal and the corresponding identifier.

The method further comprising: broadcasting the position information to a Bluetooth MESH network; and receiving the position information from the Bluetooth MESH network by a third Bluetooth module; wherein the first Bluetooth module, the second Bluetooth module and the third Bluetooth module are networked to form the Bluetooth MESH network.

A multi-hop wireless link is established between the first Bluetooth module, one or more of the second Bluetooth modules, and the third Bluetooth module when transmitting the position information from the first Bluetooth module to the third Bluetooth module.

Information reflecting the association of the position information of the elevator car and the signal strength information and the corresponding identifier and used for determining the position information of the elevator car are configured in the first Bluetooth module and/or the second Bluetooth module of the system.

The information of the association is presented by a table or a signal strength-position calculation; wherein in the step of determining the position information of the elevator car: based on the received signal strength information of the Bluetooth signal and the corresponding identifier, corresponding position information is found out from the table; or based on the received signal strength information of the Bluetooth signal, the corresponding position information is calculated using the signal strength-position calculation.

The association is obtained by learning in advance in the following manner: an elevator car with known position information travelling in the up-down direction of the elevator hoistway, recording the signal strength information of one or more Bluetooth signals received by the first Bluetooth module corresponding to each position and the corresponding identifier, and generating the association based on the known position information and the correspondingly recorded signal strength information and the corresponding identifier.

According to a third aspect of the present invention, there is provided an elevator system that comprises an elevator car and an elevator control device for controlling the elevator car to travel in an elevator hoistway, wherein the elevator system further comprises the system for acquiring position information of the elevator car as described by any one of the first aspect.

The position information is transmitted via one or more of the second Bluetooth modules from the first Bluetooth module to a third Bluetooth module disposed corresponding to the elevator control device, wherein the third Bluetooth module, the first Bluetooth module, and the second Bluetooth module are networked to form a Bluetooth MESH network.

The above features and operations of the present invention will become more apparent from the following description and the accompanying drawings.

BRIEF DESCRIPTION OF THE DRAWINGS

The above and other objects and advantages of the present invention will become more complete and clear from the following detailed description in conjunction with the drawings, wherein the same or like elements are designated by the same numerals.

DETAILED DESCRIPTION OF THE EMBODIMENT(S) OF THE INVENTION

The following is a description of exemplary embodiments of the invention, examples of which are illustrated in the accompanying drawings. Wherever possible, the same reference numerals will be used to refer to the same or like parts in all of the drawings.

For simplicity and illustrative purposes, the principles of the invention are described herein primarily with reference to exemplary embodiments thereof. However, those skilled in the art will readily recognize that the same principles may apply equally to all types of systems and/or their respective executed Bluetooth wireless communication methods, and that these same principles may be implemented therein without departing from the true spirit and scope of this patent application. Moreover, in the following description, reference is made to the accompanying drawings illustrating specific exemplary embodiments. Electrical, mechanical, logical, and structural changes may be made to these embodiments without departing from the spirit and scope of the invention. Further, while the features of the invention are disclosed in connection with only one of several implementations/embodiments, as may be desired and/or advantageous for any given or identifiable function, this feature may be combined with one or more other features of other implementations/embodiments. The following description is, therefore, not to be taken in a limiting sense, and the scope of the present invention is defined by the appended claims and their equivalents.

Where used, the terms "first", "second", "third", etc. do not necessarily denote any order or priority relationship, but rather may be used to more clearly distinguish elements from each other.

Figure 1:
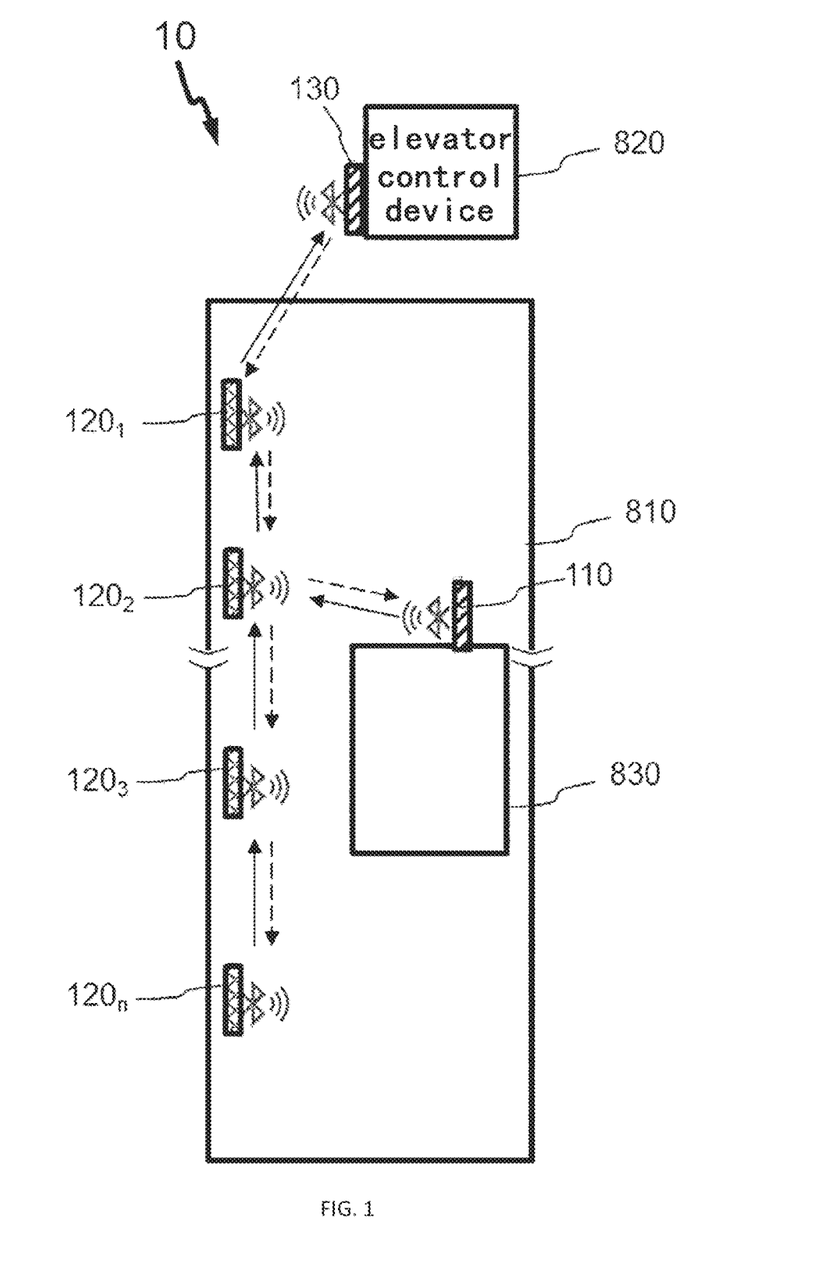
FIG. 1 is a system for acquiring position information of an elevator car according to an embodiment of the invention.
Figure 2:
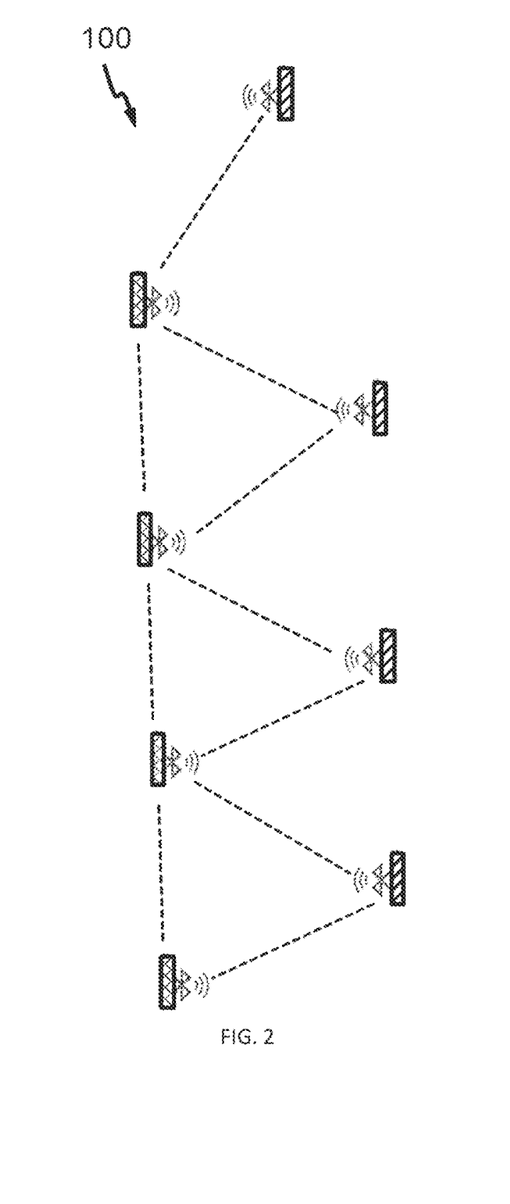
FIG. 2 illustrates a Bluetooth MESH network established by Bluetooth modules in the system shown in FIG. 1.
Figure 3:
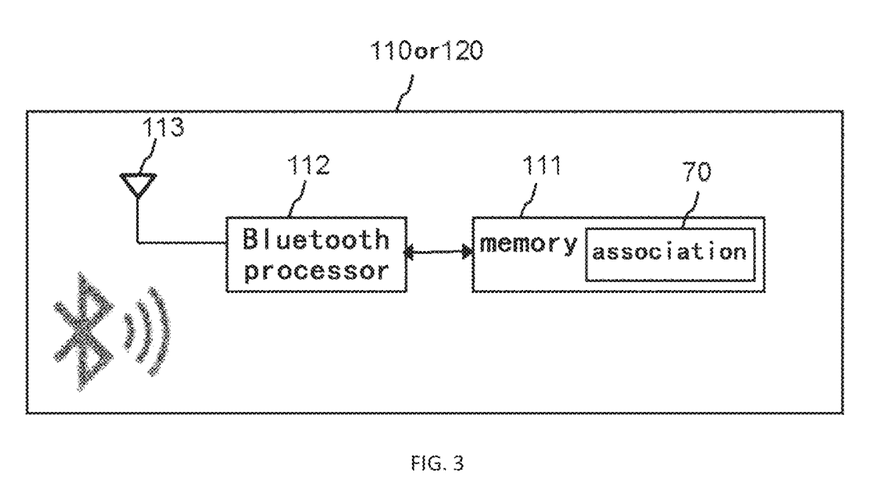
FIG. 3 is a schematic diagram of a basic structure of a first Bluetooth module or a second Bluetooth module according to an embodiment of the invention.

FIG. 1 illustrates a system for acquiring position information of an elevator car according to an embodiment of the present invention; FIG. 2 illustrates a Bluetooth MESH network established by Bluetooth modules in the system shown in FIG. 1; and FIG. 3 shows a schematic diagram of a basic structure of a first Bluetooth module or a second Bluetooth module according to an embodiment of the invention. A system of the present invention and an elevator system using the system are illustrated below as an example in conjunction with FIGS. 1 and 3.

As shown in FIG. 1, in which an elevator system using the system 10 for acquiring position information of an elevator car is briefly illustrated. The elevator system comprises an elevator car 830 and an elevator control device 820 for controlling the elevator car 830 to travel in an elevator hoistway 810 of a certain building, such that there is a need of data communication between the elevator control device 820 and the elevator car 830. For example, the elevator control device 820 and the elevator car 830 perform the transmission of the current position information (e.g., floor position information) of the elevator car 830 between each other. The elevator control device 820 get aware of the current position information of the elevator car 830 from the system 10 of an embodiment of the present invention, especially when the position of the elevator system is lost or the current position information is invalid.

FIG. 1 only shows one of the elevator cars 830 of the elevator system to illustrate how the system 10 of the present invention enables determination or acquisition of the current position information (e.g., floor position information) of the elevator cars 830 in the elevator hoistway 810. It will be appreciated that the elevator hoistway 810 may include a plurality of elevator cars travelling therein. In particular, the elevator system may include a plurality of elevator cars 830 travelling in a plurality of elevator hoistways, respectively. The same or similar system 10 may be configured correspondingly to each elevator hoistway to enable determination or acquisition of the current position information of the elevator car 830 in each elevator hoistway. The elevator control device 820 specifically controls a single elevator car 830, and may also control the plurality of elevator cars 830 in the plurality of elevator hoistways 810 in a group control manner.

For example, the system 10 can also be used to implement data communication between the third Bluetooth module 130 and the first Bluetooth module 110 on the elevator car 830. Wherein the third Bluetooth module 130, for example, is disposed corresponding to the elevator control device 820, which may be disposed together with the elevator control device 820, for example, in a room at the top of the elevator hoistway 810; the first Bluetooth module 110 travels in the up-down direction of the elevator hoistway 810 following the elevator car 830, as such the position information of the first Bluetooth module 110 itself can reflect the position information of the elevator car 830. Exemplarily, the first Bluetooth module 110 is mounted on the elevator car 830, and the antenna 113 of the first Bluetooth module 110 extends at least partially outside of the elevator car 830 to receive Bluetooth signals in the elevator hoistway 810.

Continuing with FIG. 1, therefore, in the system 10 of one embodiment of the present invention, one or more second Bluetooth modules 120, e.g. n (n is greater than or equal to 1) second Bluetooth modules $120_1$, $120_2$, $120_n$, are disposed in the elevator hoistway 810. Each second Bluetooth module 120 is configured with a corresponding identifier (e.g., a unique identifier) to enable the differentiation or recognition of the received Bluetooth signal, thereby each second Bluetooth module 120 may broadcast a Bluetooth signal containing an identifier of the second Bluetooth module 120 to the elevator hoistway 810, for example, each second Bluetooth module 120 broadcasts Bluetooth signals of the same signal strength steadily. Specifically, the Bluetooth signals broadcast by the plurality of second Bluetooth modules 120 fill or cover the elevator hoistway 810 as much as possible.

The position at which each second Bluetooth module 120 is located in the elevator hoistway 810 is known, e.g., the position information with which each second Bluetooth module 120 is located in the elevator hoistway 810 or its position information is represented or presented in the system 10, e.g., stored in the first Bluetooth module 110. Specifically, the spacing between adjacent ones of the second Bluetooth modules 120 is smaller than the Bluetooth signal transmission distance of the second Bluetooth module 120, e.g., the plurality of second Bluetooth modules 120 may be disposed substantially at equal spacing in the up-down direction of the elevator hoistway 810, and the spacing between them may be determined according to the Bluetooth signal propagation distance broadcast by each second Bluetooth module 120. As an example, a second Bluetooth module 120 may be disposed on a corresponding floor at every other floor or floors. According to the floor position where the elevator car 830 is located, the first Bluetooth module 110 on the elevator car 830 may establish a wireless link with the relatively close second Bluetooth module 120 at any time.

Continuing with FIG. 1, the first Bluetooth module 110 traveling following the elevator car 830 in the elevator hoistway 810 will be able to receive the Bluetooth signal broadcast by the second Bluetooth module 120. For example, when the elevator car 830 is in the position shown in FIG. 1, the first Bluetooth module 110 receives the Bluetooth signals of the nearest second Bluetooth module $120_2$, and of course, the first Bluetooth module 110 may also receive the Bluetooth signals of other Bluetooth modules (e.g., the first Bluetooth module $120_1$) that are relatively far away, except that the signal strength of the Bluetooth signals received in that case is relatively weak.

Thus, it will be appreciated that on the elevator car 830 traveling in the elevator hoistway 810, the second Bluetooth module 120 will be able to dynamically receive different Bluetooth signals, and the signal strength of the Bluetooth signals it receives also dynamically change. The system 10 learns or analyzes in advance this dynamic changing rule. Exemplarily, the information reflecting the association 70 of the position information of the elevator car 830 and the signal strength information received by the second Bluetooth module 120 and the corresponding identifier is learned in advance in the following manner: an elevator car with known position information travelling in the up-down direction of the elevator hoistway, e.g., several times from up to down and/or from down to up at lower speed (e.g. 0.1 m/S), while recording the signal strength information of one or more Bluetooth signals received by the first Bluetooth module 110 corresponding to each position and the corresponding identifier, generating an association 70 based on the known position information and the correspondingly recorded signal strength information and the corresponding identifier (ID). Exemplarily, the association 70 is represented in functional relationship (i.e., signal strength-position calculation) $Y=X_i$, wherein Y represents position information, and $X_i$ represents the signal strength of the Bluetooth signal of the second Bluetooth module 120 with the identifier ID of i received by the first Bluetooth module 110. Thus, it will be appreciated that the rules of the Bluetooth signal distribution on the travelling path of the elevator car 830 may be acquired by learning in advance, and that distribution rules (e.g., association 70) can be used to subsequently determine the position information of the elevator car 830.

In an embodiment, the information of association 70 may be presented by a table, such as by the simple form shown in the following Table 1:

TABLE 1

| ID of the second Bluetooth module | ... | the second Bluetooth module ID1 | the second Bluetooth module ID2 | the second Bluetooth module ID3 | ... |
|---|---|---|---|---|---|
| sensed signal strength information | ... | signal strength value x | signal strength value y | signal strength value z | ... |
| position information | ... | | floor m | | ... |

As shown in FIG. 3, the memory 111 of the first Bluetooth module 110 and/or the second Bluetooth module 120 may be pre-stored or configured with an association 70, for example, stored in the memory 111 in a table form that is relatively easy to lookup to determine floor position information. The memory 111 of first Bluetooth module 110 and/or the second Bluetooth module 120 may also correspondingly store the known position information for each of the second Bluetooth modules 120.

Continuing with FIG. 1, the system 10 is configured to determine the position information of the elevator car 830 according to the signal strength information of the Bluetooth signal received by the first Bluetooth module 110 and the corresponding identifier. In one embodiment, the system 10 achieves the function by the first Bluetooth module 110, i.e., the first Bluetooth module 110 is configured to determine the position information of the elevator car 830 according to the received signal strength information of the Bluetooth signal and the corresponding identifier. Specifically as shown in FIG. 3, the first Bluetooth module 110 includes a memory 110, a Bluetooth processor 112, and an antenna 113, the antenna 113 may receive Bluetooth signals in the elevator hoistway 810, the Bluetooth processor 112 may also determine a signal strength value of each Bluetooth signal received in response to a request, e.g., from the elevator control device 820, and parse from the Bluetooth signal to obtain an identifier of a certain second Bluetooth module 120 broadcasting the Bluetooth signal. The Bluetooth processor 112 is further configured to determine the position information of the elevator car 830 according to the signal strength information and the corresponding identifier, during which the Bluetooth processor 112 may store in advance the information of the association 70, such as table information similar to that of Table 1 or signal strength-position calculation Y=Xi, in the memory 113. Specifically, the Bluetooth processor 112, based on the received signal strength information of the Bluetooth signal and the corresponding identifier, may find out corresponding floor position information from a table such as Table 1. Exemplarily, if the sensed Bluetooth signal is the second Bluetooth module ID1, ID2, and ID3 as in the Table 1, and the signal strength values are x, y, and z, respectively, then the corresponding floor m at which the elevator car 830 is currently located may be found out from Table 1, i.e. the Bluetooth processor 112 may acquire the floor position information m.

In yet another embodiment, the Bluetooth processor 112 calculates the corresponding position information using the corresponding signal strength-position calculation $Y=X_i$ based on the received signal strength information of the Bluetooth signal, not only the specific floor position information but also the specific height position (e.g., a height position of x meters) of the elevator car 830 in the elevator hoistway 810 can be calculated by that calculation. Thus, in certain specific applications, even if the elevator car 830 is positioned between adjacent floor positions, its specific height (for example, the two floors the elevator car 830 is between may be located) may be located by the system 10 according to the present invention.

Thus, the system 10 of embodiments of the present invention can enable the automatic acquisition of the position information m and does not rely on the traditional method of recorrection of the position information of the elevator system by driving the elevator car 830 to run to the bottommost or uppermost end of the elevator hoistway under the control of the elevator control device 820, providing convenient method of acquisition of the position information and avoiding bring panic to the passengers due to the action of the elevator car 830 during the above correction process, thus providing great passenger experience.

To facilitate wireless transmission of the position information obtained by system 10 to e.g., the third Bluetooth module 130 disposed corresponding to the elevator controller 820, the third Bluetooth module 130, the first Bluetooth module 110, and the second Bluetooth module 120 are networked together to form a Bluetooth MESH network 100 as illustrated in FIG. 2, so any one of the third Bluetooth module 130, the first Bluetooth module 110, and the second Bluetooth module 120 form a MESH node in the network topology, wherein communication between one MESH node and adjacent one or more MESH nodes becomes very convenient, even data transmission between two further MESH nodes becomes fully feasible. This would be advantageous to get rid of the limitation of wireless communication distance between Bluetooth modules, particularly when the length of the elevator hoistway 810 is relatively long (e.g., greater than or equal to 50 meters). The traditional Bluetooth wireless communication method is difficult to successfully achieve data transmission between the third Bluetooth module 130 and the first Bluetooth module 110 in the elevator hoistway 810, particularly when the elevator car 830 travels to a position relatively far from the elevator control device 820.

Note that during networking, the networking may be performed based on corresponding Bluetooth wireless communication protocols or specifications (e.g., flood protocols, GATT (Generic Attribute Profile) specifications, etc.), and communication may also be performed based on the selected Bluetooth wireless communication protocol or specification between two MESH nodes of the Bluetooth MESH network 100. Specifically, the above networking may be accomplished by writing corresponding protocols or specifications into ROM of any one of the third Bluetooth module 130, the first Bluetooth module 110, and the second Bluetooth module 120. Moreover, since the Bluetooth MESH network 100 has the advantage of Ad-Hoc Network, the Bluetooth MESH network 100, when applied to the elevator hoistway 810 environment, readily forms a corresponding Bluetooth MESH network for the Bluetooth module networking corresponding to each elevator hoistway 810, and the Bluetooth MESH network between adjacent elevator hoistways 810 does not interfere with each other.

After successful networking of the Bluetooth MESH network 100 of the system 10, data transmission (e.g., transmission of position information) between the third Bluetooth module 130 and the first Bluetooth module 110 may be performed via at least one of the second Bluetooth modules 120. As illustrated in FIG. 1, when the elevator car 830 travels to the bottom position of the elevator hoistway 810, the first Bluetooth module 110 establishes a wireless link with the second Bluetooth module $120_n$ automatically, the second Bluetooth module $120_n$ establish wireless links with other second Bluetooth modules in turn, and the second Bluetooth module $120_1$ nearest to the elevator control device 820 establishes a wireless link with the third Bluetooth module 130, thus establishing a multi-hop wireless link between the first Bluetooth module 110, the second Bluetooth module 120, and the third Bluetooth module 130 to enable long-range wireless communication. It will be appreciated that the wireless link corresponding to the data transmission does not necessarily include all of diffusion Bluetooth modules 120, and the diffusion Bluetooth modules 120 in the wireless link has relay functionality during data transmission.

In one embodiment, the first Bluetooth module 110 of the elevator system installed in the elevator car 830 sends the current position information of the elevator car 830 to the Bluetooth MESH network 100 (e.g., in case of the missing of the position of the elevator system or that the current position information is invalid), that position information may be transmitted to the third Bluetooth module 130 via, for example, the second Bluetooth module $120_2$, $120_1$, the elevator control device 820 may thereby acquire the current position information of the elevator car 830, and then perform subsequent processing operations.

It will be appreciated that the type of information transmitted by means of the system 10 between the elevator car 830 and the elevator control device 820 is not limited to the position information of the above embodiments, that is, the information content transmitted by the system 10 is not limitative.

Note that while the above embodiment is that an example system 10 facilitates data transmission between the elevator car 830 and the elevator control device 820, the system 10 may facilitate to enable data transmission between more components of the elevator system, such as position information transmission between the elevator car 830 and other components of the motor room to help other components within the elevator system acquire current position information of the elevator car 830. According to the change of the receiving component of the position information, the Bluetooth modules can be respectively disposed corresponding to the components and networked into the Bluetooth MESH network 100, so that the characteristic of good extensibility of the Bluetooth MESH network can be fully developed.

The Bluetooth MESH network 100 in the system 10 of the above embodiment is easy to network, which is well suited for application in an elevator hoistway environment and greatly reduces the workload of networking, thus achieving low cost. Also, the system 10 of the above embodiment has a good extensibility, so it is easy to add new MESH nodes according to the specific parameters, environment and the like of the elevator hoistway to make the Bluetooth signal substantially cover the whole elevator hoistway 810. The system 10 further highlights its advantage of wireless data transmission in an elevator hoistway environment at a very long wireless communication distance when the length of the elevator hoistway is greater than or equal to 50 meters (e.g., greater than or equal to 100 meters).

It should be noted that, in other alternative embodiments, according to the specificity of the different elevator hoistway 810 environments, the number and style of the arrangement of the second Bluetooth module 120 may also vary accordingly, which also develops the feature of networking flexibility of the Bluetooth MESH network. Exemplarily, if a Bluetooth signal broadcast by a second Bluetooth module 120 may cover or fill (especially in the up-down direction) the entire elevator hoistway 810, only one second Bluetooth module 120 (not shown in FIG. 1) may be disposed in the elevator hoistway 810, e.g., a second Bluetooth module 120 disposed at the bottom or top of the elevator hoistway 810. As the elevator car 830 moves relative to the second Bluetooth module 120, the signal strength of the Bluetooth signal received by the corresponding first Bluetooth module 110 changes regularly, and the system 10 may also determine its position information based on the received signal strength of the Bluetooth signal.

Continuing with FIG. 1, the third Bluetooth module 130, the first Bluetooth module 110, and the second Bluetooth module 120 may specifically be Bluetooth Low Energy (BLE) Modules, so that the Bluetooth modules consume small amount of power, relatively easy to maintain, and reduce maintenance workload in the elevator hoistway environment.

It should be noted that the first Bluetooth module 110, the third Bluetooth module 130, and the second Bluetooth module 120 in the Bluetooth MESH network 100 may be assigned a unique identifier, respectively, according to which the Bluetooth module corresponding to the sender and receiver of the wireless data transmission may be determined during data transmission. It will be appreciated that the Bluetooth module as a data sender and the Bluetooth module as a data receiver may be customized in each MESH node in the Bluetooth MESH network 100, thus providing great data transmission flexibility.

Continuing with FIGS. 1 and 3, in yet another embodiment, the system 10 may implement the function of determining position information of the elevator car 830 by the second Bluetooth module 120, i.e., the second Bluetooth module 110 is configured to determine the position information of the elevator car 830 in the elevator hoistway according to the received signal strength information of the Bluetooth signal and the corresponding identifier, and to broadcast the position information to the Bluetooth MESH network 100. The signal strength information and the corresponding identifier required by the second Bluetooth module 110 to enable this function may be received from the Bluetooth MESH network 100. In this case, the first Bluetooth module 110 broadcasts the signal strength information and the corresponding identifier to the Bluetooth MESH network 100.

Referring specifically to FIG. 3, the second Bluetooth module 120 includes a memory 110, a Bluetooth processor 112, and an antenna 113. The antenna 113 may broadcast Bluetooth signals to the elevator hoistway 810, and may also receive the Bluetooth signal broadcast by the first Bluetooth module 110. The Bluetooth processor 112 may also determine signal strength values for each received Bluetooth signal, in response to, for example, a request from the elevator control device 820, and parse from the Bluetooth signal to obtain the identifier of a certain second Bluetooth module 120 broadcasting the Bluetooth signal. The Bluetooth processor 112 is further configured to determine the position information of the elevator car 830 in the elevator hoistway from the signal strength information and the corresponding identifier, during which the Bluetooth processor 112 may store in advance the information of the association 70, such as the table information, in the memory 113. Specifically, the Bluetooth processor 112 may find out corresponding floor position information from a table such as the Table 1 based on the received signal strength information of the Bluetooth signal and the corresponding identifier. Exemplarily, if the sensed Bluetooth signal is the second Bluetooth module ID1, ID2, and ID3 in the Table 1, and the signal strength values are x, y, and z, respectively, then the corresponding floor m at which the elevator car 830 is currently located may be found out from Table 1, i.e. the Bluetooth processor 112 may acquire the floor position information m.

From the above embodiment, it will be appreciated by analogy that having networked the Bluetooth MESH network 100, the functionality of determining the position information of the elevator car 830 enabled by the first Bluetooth module 110 or the second Bluetooth module 120 may also be enabled by the third Bluetooth module 130 that may also be constructed with the method shown in FIG. 3. Such that the information of the wireless transmission between the first Bluetooth module 110 and the third Bluetooth module 130 includes the signal strength information of the Bluetooth signal and the corresponding identifier received in real time by the first Bluetooth module 110.

The system 10 of the above embodiment is not only convenient, simple and efficient in the acquisition of position information, but also offers convenient wireless transmission that is not limited by the length of the elevator hoistway, and is particularly suitable for application in an elevator system of high-rise or even super high-rise buildings.

Figure 4:
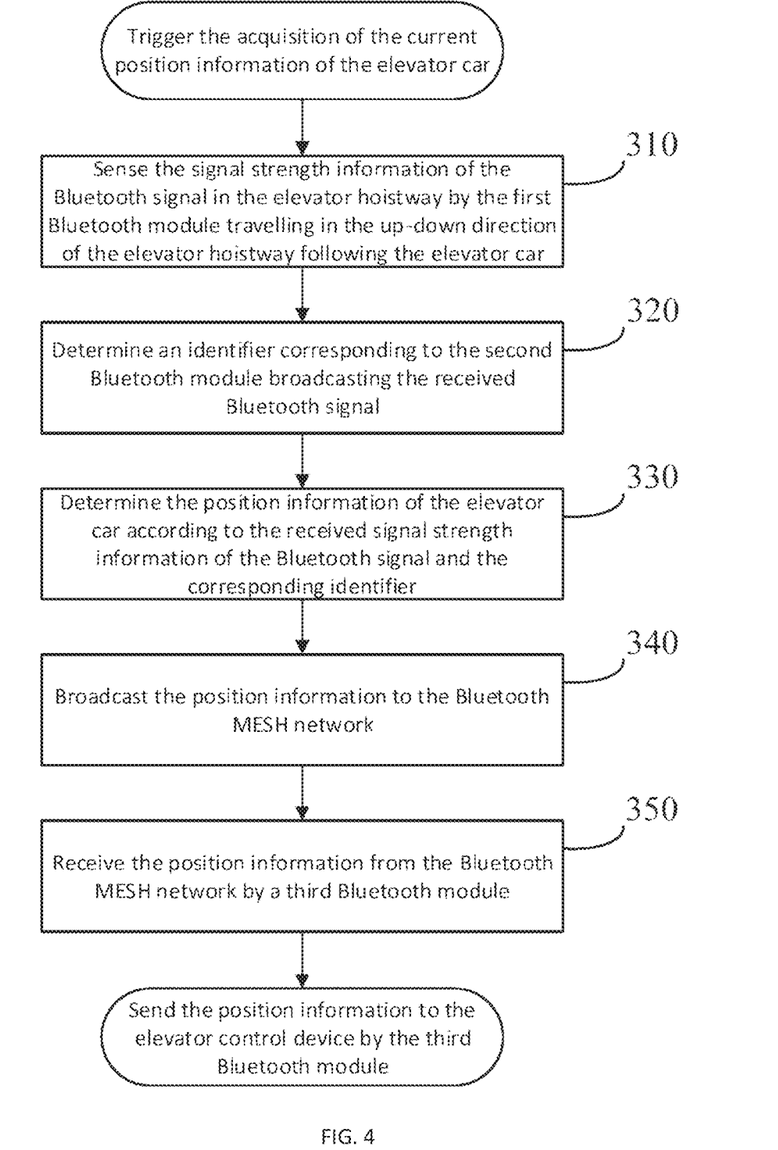
FIG. 4 is a method for acquiring position information of an elevator car according to an embodiment of the invention.

FIG. 4 illustrates a method for acquiring position information of an elevator car according to an embodiment of the invention. An exemplary position information acquisition method according to an embodiment of the present invention is illustrated below in conjunction with FIG. 1 to 4.

In the first step S310, in the event that the acquisition of the current position information of the elevator car is triggered (for example, that the missing of the position information by the elevator control device 820 triggers the second Bluetooth module 120 to acquire current position information of the elevator car), sense the signal strength information of the Bluetooth signals in the elevator hoistway 810 by the first Bluetooth module 110 travelling in the upper and lower direction of the elevator hoistway 810 following the elevator car 830. Wherein the Bluetooth signal includes a Bluetooth signal comprises the Bluetooth signal containing an identifier of a second Bluetooth module broadcast to the elevator hoistway 810 by the second Bluetooth module 120 disposed in the elevator hoistway 810. In one embodiment, the first Bluetooth module 110, the second Bluetooth module 120, and the third Bluetooth module 130 are networked in advance to form the Bluetooth MESH network 100.

In step S320, an identifier corresponding to the second Bluetooth module broadcasting the received Bluetooth signal is determined. In this step, the identifier in the received Bluetooth signal may be obtained by parsing based on the particular Bluetooth protocol.

In step S330, determine the position information of the elevator car according to the received signal strength information of the Bluetooth signal and the corresponding identifier. It should be noted that this step may be done in the first Bluetooth module 110, and may also be done by the second Bluetooth module 120, or even the third Bluetooth module 130 if the first Bluetooth module 110 broadcasts the received signal strength information and the corresponding identifier to the Bluetooth MESH network 100.

In this step, the position information of the elevator car is determined based on information reflecting the association 70 between the position information of the elevator car and the signal strength information and the corresponding identifier. The association 70 may be acquired by learning in advance. Exemplarily, the information reflecting the association 70 between the position information of the elevator car 830 and the signal strength information received by the second Bluetooth module 120 and the corresponding identifier are obtained by learning in advance in the following manner: an elevator car with known position information travelling in the up-down direction of the elevator hoistway, e.g., several times from up to down and/or from down to up at lower speed (e.g. 0.1 m/S), while recording the signal strength information of one or more Bluetooth signals received by the first Bluetooth module 110 corresponding to each position and the corresponding identifier, generating an association 70 based on the known position information and the correspondingly recorded signal strength information and the corresponding identifier (ID). Exemplarily, the association 70 is represented in functional relationship (i.e., signal strength-position calculation) $Y=X_i$, wherein Y represents position information, and $X_i$ represents the signal strength of the Bluetooth signal of the second Bluetooth module 120 with the identifier ID of i received by the first Bluetooth module 110.

In an embodiment, the information of the association 70 is presented, for example, by a simple form shown as the above Table 1. If the sensed Bluetooth signal is the second Bluetooth module ID1, ID2, and ID3 in Table 1, and the signal strength values are x, y, and z, respectively, then the corresponding floor m at which the elevator car 830 is currently located may be found out from Table 1, i.e. the Bluetooth processor 112 may acquire the floor position information m.

In yet another embodiment, the information of the association 70 is presented by e.g. the above signal strength-position calculation $Y=X_i$. Based on the received signal strength information of the Bluetooth signal, the corresponding position information is calculated using the corresponding signal strength-position calculation $Y=X_i$. Not only the specific floor position information but also the specific height position (e.g., a height position of x meters) of the elevator car 830 in the elevator hoistway 810 can be calculated by that calculation.

In an embodiment, in step S340, the position information is broadcast to the Bluetooth MESH network, for example, the position information may be broadcast to the Bluetooth MESH network through the first Bluetooth module 110. Exemplarily, in this step, the position information may be transmitted to the third Bluetooth module 130 via, for example, the second Bluetooth module 120$_2$, 120$_1$.

In step S350, the third Bluetooth module 130 receives position information from the Bluetooth MESH network 100.

In this way, the third Bluetooth module 130 sends the position information to the elevator control device 820 that requires the position information, and the method shown in FIG. 3 ends substantially.

The position information acquiring method of the above embodiment is simple to implement, and does not require the elevator car to run to the bottom or top of the hoistway for position recovery, thus maintaining the stability and safety during the running of the elevator. Also, where a Bluetooth MESH network 100 is established, the method offers wireless transmission of position information and the like which is not limited by the length of the elevator hoistway 810, and is particularly suitable for application in an elevator system of high-rise or even super high-rise buildings.

It will be understood that in the scheme of performing data relay transmission by means of the second Bluetooth module in the MESH network 100 according to the embodiment of the present invention, the Bluetooth module(s) transmitting data (e.g., the first Bluetooth module 110) and the Bluetooth module(s) receiving data (e.g., the third Bluetooth module 130) is not limited to the above embodiment, while they may be specifically defined or set according to the specific requirements of the sender and receiver of the data transmission. For example, a Bluetooth module transmitting data and/or a Bluetooth module receiving data is also a Bluetooth module disposed corresponding to a certain component in the elevator hoistway 810. Also, the number of Bluetooth module(s) transmitting data (e.g., the first Bluetooth module 110) and the Bluetooth module(s) receiving the data (e.g., the third Bluetooth module 130) is also not limited. For example, a plurality of Bluetooth modules of a plurality of components may be defined as receivers.

Although different non-limiting implementations have particularly illustrated assemblies, implementations of the invention are not limited to these particular combinations. It is possible to use some of the assemblies or features from any of the non-limiting implementations in combination with features or assemblies from any other non-limiting implementations.

Although particular order of steps is shown, disclosed, and claimed, it is to be understood that the steps may be implemented in any order, separated or combined unless otherwise indicated and still benefit from the present disclosure.

The foregoing description is exemplary and is not intended to be limited therein. Various non-limiting implementations are disclosed herein, however, one of ordinary skill in the art will recognize that various modifications and variations will fall within the scope of the appended claims in light of the above teachings. It is, therefore, to be understood that within the scope of the appended claims, the disclosure may be practiced otherwise than as specifically disclosed. For this reason, the appended claims should be studied to determine the true scope and content.

What is claimed is:

1. A system for acquiring position information of an elevator car, comprising:
   a first Bluetooth module travelling in an up-down direction of an elevator hoistway following the elevator car, and
   a plurality of second Bluetooth module disposed in the elevator hoistway in a substantially up-down direction of the elevator hoistway;
   wherein each second Bluetooth module broadcasts a Bluetooth signal containing an identifier of the second Bluetooth module to the elevator hoistway, and the first Bluetooth module senses signal strength information of the Bluetooth signals it receives and determines the identifiers corresponding to the each second Bluetooth module broadcasting the received Bluetooth signal;
   the system is configured to determine the position information of the elevator car according to received signal strength information of the Bluetooth signals and a corresponding identifier.

2. The system of claim 1, wherein the first Bluetooth module and the plurality of second Bluetooth modules are networked to form a Bluetooth MESH network.

3. The system of claim 2, wherein the first Bluetooth module in the system is configured to broadcast the signal strength information of the Bluetooth signal it receives and the identifier corresponding to the second Bluetooth module broadcasting the Bluetooth signal to the Bluetooth MESH network, and one of the plurality of second Bluetooth modules in the system is configured to determine the position information of the elevator car based on the received signal strength information and the corresponding identifier and to broadcast the position information to the Bluetooth MESH network.

4. The system of claim 1, wherein the first Bluetooth module in the system is configured to determine the position information of the elevator car according to the received signal strength information of the Bluetooth signal and the corresponding identifier.

5. The system of claim 4, wherein the first Bluetooth module in the system is further configured to broadcast the position information to the Bluetooth MESH network.

6. The system of claim 5, wherein the system is further utilized to transmit the position information to a third Bluetooth module, wherein the third Bluetooth module, the first Bluetooth module, and the second Bluetooth module(s) are networked to form the Bluetooth MESH network.

7. The system of claim 6, wherein a multi-hop wireless link is established between the first Bluetooth module, one or more of the second Bluetooth modules, and the third Bluetooth module when transmitting the position information from the first Bluetooth module to the third Bluetooth module.

8. The system of claim 6, wherein the first Bluetooth module, the second Bluetooth module, and the third Bluetooth module are Bluetooth Low Power modules.

9. The system of claim 6, wherein a length of the elevator hoistway is greater than or equal to 50 meters.

10. The system of claim 6, wherein the first Bluetooth module, the second Bluetooth module, and the third Bluetooth module are assigned a unique identifier, respectively.

11. The system of claim 1, wherein information reflecting the association of the position information of the elevator car and the signal strength information and the corresponding identifier and used for determining the position information of the elevator car is configured in the first Bluetooth module and/or the second Bluetooth module of the system.

12. The system of claim 11, wherein the information of the association is presented by a table or a signal strength-position calculation; wherein based on the received signal strength information of the Bluetooth signal and the corresponding identifier, corresponding position information is found out from the table; or based on the received signal strength information of the Bluetooth signal, the corresponding position information is calculated using the signal strength-position calculation.

13. The system of claim 11, wherein the association is obtained by learning in advance in the following manner: the elevator car with known position information travelling in the up-down direction of the elevator hoistway, recording the signal strength information of one or more of the Bluetooth signals received by the first Bluetooth module corresponding to each position and the corresponding identifier, and generating the association based on the known position information and the correspondingly recorded signal strength information and the corresponding identifier.

14. The system of claim 1, wherein a spacing between adjacent ones of the second Bluetooth modules is smaller than a Bluetooth signal transmission distance of the second Bluetooth module.

15. An elevator system comprising an elevator car and an elevator control device for controlling the elevator car to travel in an elevator hoistway, wherein the system further comprises a system for acquiring position information of the elevator car as claimed in claim 1.

16. The elevator system of claim 15, wherein the position information is transmitted via one or more of the second Bluetooth modules from the first Bluetooth module to a third Bluetooth module disposed corresponding to the elevator control device, wherein the third Bluetooth module, the first Bluetooth module, and the second Bluetooth modules are networked to form a Bluetooth MESH network.

17. A method for acquiring position information of an elevator car, comprising:
   sensing signal strength information of a Bluetooth signal in an elevator hoistway by a first Bluetooth module travelling in an up-down direction of the elevator hoistway following the elevator car, wherein the Bluetooth signal comprises the Bluetooth signal containing an identifier of a plurality of second Bluetooth modules broadcast to the elevator hoistway by the second Bluetooth modules disposed in the elevator hoistway in a substantially up-down direction of the elevator hoistway;

determining the identifier corresponding to the plurality of second Bluetooth modules broadcasting the received Bluetooth signals; and determining the position information of the elevator car according to the received signal strength information of the Bluetooth signal and the corresponding identifier.

18. The method of claim 17, further comprising:

broadcasting the position information to a Bluetooth MESH network; and receiving the position information from the Bluetooth MESH network by a third Bluetooth module;

wherein the first Bluetooth module, the second Bluetooth modules and the third Bluetooth module are networked to form the Bluetooth MESH network.

19. The method of claim 18, wherein a multi-hop wireless link is established between the first Bluetooth module, the second Bluetooth modules, and the third Bluetooth module when transmitting the position information from the first Bluetooth module to the third Bluetooth module.

20. The method of claim 17, wherein information reflecting the association of the position information of the elevator car and the signal strength information and the corresponding identifier and used for determining the position information of the elevator car is configured in the first Bluetooth module and/or the second Bluetooth modules.

21. The method of claim 20, wherein the information of the association is presented by a table or a signal strength-position calculation; wherein in determining the position information of the elevator car:

based on the received signal strength information of the Bluetooth signal and the corresponding identifier, corresponding position information is found out from the table; or based on the received signal strength information of the Bluetooth signal, the corresponding position information is calculated using the signal strength-position calculation.

22. The method of claim 20, wherein the association is obtained by learning in advance in the following manner: the elevator car with known position information travelling in the up-down direction of the elevator hoistway, recording the signal strength information of one or more of the Bluetooth signals received by the first Bluetooth module corresponding to each position and the corresponding identifier, and generating the association based on the known position information and the correspondingly recorded signal strength information and the corresponding identifier.

* * * * *